(12) United States Patent
Kessler

(10) Patent No.: US 6,494,760 B1
(45) Date of Patent: Dec. 17, 2002

(54) WATER FILLED HOOP CONSTRUCTION

(75) Inventor: Brian Kessler, Los Angeles, CA (US)

(73) Assignee: Maui Toys, Inc., Youngstown, OH (US)

( * ) Notice: Subject to any disclaimer, the term of this patent is extended or adjusted under 35 U.S.C. 154(b) by 0 days.

(21) Appl. No.: 10/188,150

(22) Filed: Jul. 3, 2002

Related U.S. Application Data

(60) Provisional application No. 60/305,853, filed on Jul. 18, 2001.

(51) Int. Cl.$^7$ ............................................. A63H 33/02
(52) U.S. Cl. ...................... 446/236; 446/267; 482/110
(58) Field of Search .................. 446/267, 236, 446/242; 472/133, 135; 482/110

(56) References Cited

U.S. PATENT DOCUMENTS

| | | |
|---|---|---|
| 2,738,616 A | 3/1956 | Windle |
| 2,979,860 A | 4/1961 | Barta |
| 3,956,851 A | 5/1976 | Tapinekis |
| 3,993,334 A | 11/1976 | Fridman et al. |
| 4,090,324 A | 5/1978 | Compton |
| 4,304,067 A | 12/1981 | Petrosky |
| 4,986,535 A | 1/1991 | Hull et al. |
| 5,629,068 A | 5/1997 | Mekka et al. |
| 5,823,846 A | 10/1998 | Arriola et al. |
| 5,895,309 A * | 4/1999 | Spector ...................... 446/220 |
| 5,989,097 A | 11/1999 | Lebedz |
| 6,001,048 A | 12/1999 | Taylor |
| 6,059,632 A * | 5/2000 | Sassak ......................... 403/298 |
| 6,431,939 B1 * | 8/2002 | Roth et al. ................... 446/236 |

FOREIGN PATENT DOCUMENTS

| | | |
|---|---|---|
| FR | 1208935 | 2/1960 |
| FR | 1221877 | 3/1960 |

* cited by examiner

*Primary Examiner*—Jacob K. Ackun
(74) *Attorney, Agent, or Firm*—Browdy and Neimark, P.L.L.C.

(57) ABSTRACT

An exercise and/or play hoop, made of semi-rigid plastic tubing, is partially filed with water (30) to between ⅙ and ½ full, most preferably ¼ full. The water improves the dynamics of the hoop and makes it easier to keep the hoop elevated by gyration. The hoop is made of a length of hoop tube (10) bent into a circle. A coupling tube (20) is inserted where the ends (11, 12) abut, spanning the joint. The coupling tube includes a bore (25) through which the liquid flows circumferentially around inside the hoop, and past the joint. The joint is sealed on the outside with a shrink-plastic tube. A decorative, preferably iridescent cover (18) may cover the hoop.

9 Claims, 1 Drawing Sheet

WATER FILLED HOOP CONSTRUCTION

This application claims the benefit of provisional application No. 60/305,858, filed Jul. 18, 2001.

FIELD OF THE INVENTION

The present invention relates to play and/or exercise hoops of the type commonly known as HULA HOOPS.

DESCRIPTION OF THE RELATED ART

Play hoops of the HULA HOOP type are widely known. They are used for rolling and gyrating about the hips and other parts of the body. Hoops are typically made from a length of plastic tubing by bending the length into a circle and joining the ends.

Such hoops do not have any internal damping, which restricts their efficiency. To gyrate a conventional hoop about the hips requires considerable work because the needed rotational speed is quite high.

Another drawback of previous hoops is that they are too light. The conventional hoops can be made of heavier-walled plastic tubing, but this is expensive and makes for difficult bending into the required circular form.

One previous hoop designed by the present applicant had water contained therein in an attempt to solve these problems, but this earlier liquid-filled hoop was not successful. The water leaked out and the hoop did not function properly.

RELATED APPLICATIONS

A play and/or exercise hoop is disclosed in copending application Ser. No. 09/395,359, the contents of which are incorporated herein by reference. Such play and exercise hoop, which has achieved commercial success, is provided with internal inertia shifting. This is accomplished by partially filling the hollow tubular hoop with water. The trapped water increases the mass, provides internal damping of any motion (especially axial acceleration or deceleration), and leads to novel motions because of the shifting of the water inside.

Unlike the previous water-containing hoop, the circular hoop of the copending application allows the trapped water or liquid to freely circulate all the way around the hoop circumferentially; thus when the hoop is rotated about the body, the liquid remains in the part of the hoop opposite the part in contact with the body of the user, and the rolling motion of the hoop is smooth. The flow of the water around the circumference of the hoop must not be blocked if desirable toy dynamics are to be achieved.

The water filling of the copending application makes the typical HULA-HOOP hip gyration in which the hoop remains elevated, and similar gyrations, easier. This is because the water decreases the rotational speed needed in the hip motion, and slower rotation about the body is possible. Centrifugal force causes the water to shift as the circular hoop is rotated or gyrated about the hips, permitting a slower, easier and less tiring rotation.

The water-tight hoop-joint of the copending application includes a coupling tube, disposed inside the outer main hoop tube at the joint, having a large bore through which the liquid can freely flow. The coupling tube is adapted to receive a seal, such as an O-ring, between the outer wall of the inner coupling and inner wall of the outer hoop tube. This construction, however, is undesirably costly and inefficient as regards the manufacturing process.

SUMMARY OF THE INVENTION

The present invention relates to an improvement over the hoop of the copending application, particularly as regards the joint between the two ends of the hoop tube. Thus, according to the present invention, an improved and less expensive joint is provided by the use of a mechanical fastening and a shrink tube, without inhibiting the flow of liquid past the joint and without leaking of water from the hoop joint.

BRIEF DESCRIPTION OF THE DRAWING

The above and other objects and the nature and advantages of the present invention will become more apparent from the following detailed description of an embodiment [s] taken in conjunction with the drawings, wherein.

DETAILED DESCRIPTION OF THE PREFERRED EMBODIMENT

Figure 1:
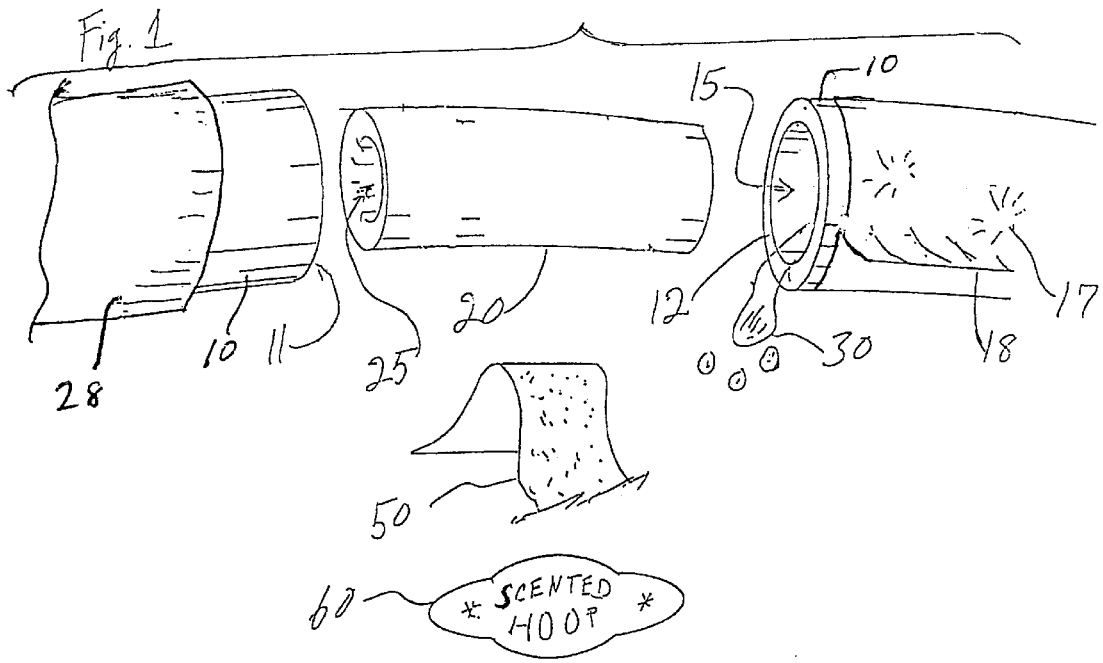
FIG. 1 is an exploded perspective view of the hoop of the present invention, also showing its construction.
Figure 2:
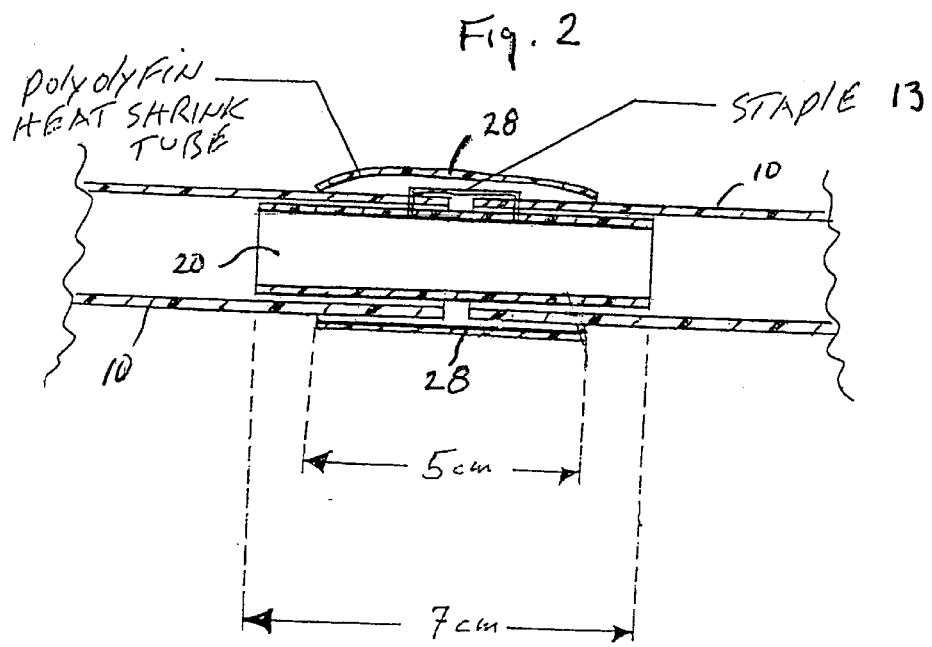
FIG. 2 is a cross-sectional view thereof prior to shrinking of the shrink tube.

FIG. 1 shows two ends 11 and 12 of a circular hoop 10 shown in exploded view, separated to show the internal coupling tube 20, which is covered when the two ends 11 and 12 are butted together and the hoop is completed in the form of a hoop tube joint as more completely shown in FIG. 2. The hoop tube 10 extends in a full circle (not shown) between its two ends 11 and 12, as is conventional in hoops.

The hoop tube 10 is semi-rigid and is preferably made of extruded polyethylene or polyethylene terephthalate glycol (PETG), a type of saturated (i.e. thermoplastic) polyester, having a wall thickness for example of about 1 mm. Other plastics may be used for the hoop tube. Preferably, the outside is covered with a decorative pattern such as iridescent sparkles 17, of the type employing diffraction rulings to cause scintillating colors. This decoration 17 may be applied in the form of a plastic film 18 wrapped around the hoop tube 10 and adhered to its outside surface. Such films having diffraction rulings may be produced by holographic printing. Other types of exterior decorations are also possible, but the iridescent-like effect produced by the diffraction rulings is particularly striking during rotation of the hoop about the hips, and therefore most desirable.

A liquid 30 partially fills the interior space 15 of the hoop. Preferably the interior space 15 is partially filled with the liquid more than ⅙ full, and less than half full, by volume. Still more preferably, the hoop is between ⅙ and ⅔ full of liquid; and an optimum amount of liquid is approximately ¼ full. Less full than ⅙ provides an insufficient effect, and more than ½ overcomes the desirable inertial shifting effect.

The liquid 30 is preferably water, which may be treated to resist bacterial or fungal growth, to resist freezing, and/or the like. Preferably, the water 30 is scented with a perfume or the like so that the hoop emits a pleasant odor; or the pleasant scent-producing chemical may instead be incorporated into the film 18, if present, or within the wall of the hoop tube 10 itself.

Other freely flowable materials may be used in place of the liquid 30, although water is preferable as indicated above. Other freely flowable materials can be routinely tested for suitability, with the objective that the freely flowing material will flow sufficiently quickly to that part of the hoop opposite, i.e. roughly 180° from, the part of the hoop which is in contact with the user's body during rotation, and with the further objective that the freely flowable material be able to pass quickly through the coupling tube, described below.

To couple the two ends 11 and 12 of the hoop tube 10 together, an inner coupling tube 20 is provided, preferably in the form of a hard, rigid tube of hard plastic or metal, e.g. aluminum. When the joint is made as shown in FIG. 2, the coupling 20 is roughly centered in the joint, so that the hoop tube ends 11 and 12 abut adjacent the approximate mid-point of the coupling 20. Contrary to the hoop of the copending application, no O-rings are provided between the coupling tube 20 and the outer surfaces of the respective ends 11 and 12 of the hoop tube 10, thus avoiding extra parts and their placement, as well as any fabrication of a complex coupling tube with integral O-rings. Instead, the coupling tube 20 can simply be a short piece, e.g. about 5 to about 10 cm, of extruded tubing. The coupling tube 20 is simply inserted into the two ends 11 and 12 and optionally mechanically fixed such as by one or two metal staples 13 which preferably span the butt, or an adhesive may be used.

Surprisingly, however, mechanical fixing is unnecessary, as the friction fit, coupled with the heat shrinkable covering tube as explained below, is sufficient to hold the ends together without any other elements or means. To further enhance the frictional engagement, the coupling tube 20 may be provided with a roughened outer surface.

An important feature of the present invention is that the water 30 is free to pass through the coupling tube 20, and so a large diameter through-bore 25 is provided in coupling tube 20. The bore 25 allows the water to flow circumferentially around inside the hoop past the joint, so that it does not pile up and ruin the dynamics of the finished hoop. In one embodiment, the inner diameter of the hoop tube is 1.5 cm, and the diameter of the bore 25 of the connector tube 20 is 1.1 cm, and in general the bore 25 should have a cross-sectional area no less than about half the cross-sectional area of the interior of the hoop tube 10 to provide sufficient pass-through of water past the bore 25, especially in the case of hoop tubes having diameter bores no greater than 1.5 cm. However, as the hoop tube diameter increases, this rule becomes increasingly less important.

Due to an improvement according to the present invention as described below, the wall thickness of the coupling tube 20 can also be more safely reduced to provide a greater bore diameter. Additionally, to further facilitate flow of liquid through the inner coupling tube 20 so that such liquid can then more freely flow therethrough, the ends of the coupling tube 20 can be tapered instead of extending radially as shown in FIGS. 1 and 2.

Once the joint is assembled as shown in FIG. 2, a heat shrinkable tube 28, initially of diameter greater than the outer diameter of the hoop tube 10, is slipped over the butt joint between the two ends 11 and 12 of the hoop tube 10 as shown in FIG. 2. Such heat shrinkable tube 28, which may be formed of heat shrinkable polyolefin, PVC or other heat-shrinkable plastic film, will have been initially slid over one end of the hoop tube 10 before insertion of the connector tube 20 as shown in FIG. 1. After placement of the heat shrinkable tube 28 in the position shown in FIG. 2, heat is applied to shrink the tube tightly to the exterior of the butt joint. This provides a strong, water-tight seal in a simpler and less expensive way, and further augments the frictional engagement of the connector tube 20 holding the ends of the hoop tube 10 together.

In the illustrated embodiment, the heat shrinkable tube 28 has a length of 5 cm, but it will be understood that this length can be varied considerably. The heat-shrinkable tube 28 may be suitably decorated. Alternatively, to cover the tube 28 after it has been heat shrunk about the butt ends 11 and 12 of the hoop tube 10, if desired, a label 60 may be applied. Moreover, if desired, the heat shrunk tube 28 can also be wrapped with a tape 50, either underneath the label 60 or in place of the label 60.

While the optional mechanical fastening of the hoop tube 10 and the coupling tube 20 is preferably by use of one or more staples, they may also or otherwise be glued, welded, or otherwise fastened, and such fastening may comprise a liquid seal. However, as indicated above, no mechanical fastening, gluing, welding or the like is necessary.

The cross-sectional shape of the hoop tube may be other than circular, e.g. octagonal, rectangular, ellipsoidal, etc., without departing from the invention. The diameters of both the hoop and the hoop tube may also vary.

The foregoing description of the specific embodiments will so fully reveal the general nature of the invention that other can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. In a circular hoop for hip gyration comprising:
    a hoop tube extending generally in a circle between two ends of the hoop tube, the ends abutting at a hoop tube joint;
    a flowable substance disposed inside the hoop tube;
    an inner coupling tube disposed inside the outer tube and spanning the joint, the coupling tube including a bore through which the flowable substance is freely flowable circumferentially in the hoop past the joint; and
    a seal preventing the flowable substance from leaking between the coupling tube and hoop tube and through the hoop tube joint, the improvement wherein
    the ends of said hoop tube are covered with heat shrunk tube which in part constitutes said seal.

2. The circular hoop of claim 1, wherein said flowable substance is a liquid which fills approximately between ⅙ and ½ of an interior space of said hoop.

3. The hoop according to claim 2, wherein the liquid fills approximately between ⅙ and ⅔ of the interior space of the hoop.

4. The hoop according to claim 2, wherein the liquid fills approximately ¼ of the interior space of the hoop.

5. The hoop according to claim 1, comprising a decorative film covering on the hoop tube, said film being printed with diffraction rulings to provide an iridescent-like appearance.

6. The hoop according to claim 1, wherein the cross-sectional area of the bore is not less than ½ the cross-sectional area of the hoop tube interior.

7. The hoop according to claim 6, wherein said hoop tube is formed of extruded polyethylene or polyester.

8. The hoop according to claim 1, wherein said coupling tube and the ends of said hoop tube are mechanically fastened together.

9. The hoop according to claim 8, wherein said mechanical fastening comprises at least one staple.

\* \* \* \* \*